United States Patent
Walker

(12) 
(10) Patent No.: US 6,587,628 B1
(45) Date of Patent: Jul. 1, 2003

(54) OPTICAL FIBER WITH IMPROVED STRENGTH IN HIGH HUMIDITY/HIGH TEMPERATURE ENVIRONMENTS

(75) Inventor: Christopher B. Walker, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 407 days.

(21) Appl. No.: 09/721,397

(22) Filed: Nov. 22, 2000

Related U.S. Application Data
(60) Provisional application No. 60/167,359, filed on Nov. 22, 1999.

(51) Int. Cl.$^7$ ................................................ G02B 6/02
(52) U.S. Cl. .................. 385/128; 385/123; 385/127; 385/141; 427/162; 427/163.1; 427/163.2
(58) Field of Search .................................. 385/123, 127, 385/128, 141, 143, 145; 427/162, 163.1, 163.2, 165; 65/385, 443, 447

(56) References Cited

U.S. PATENT DOCUMENTS

| | | | |
|---|---|---|---|
| 4,055,458 A | 10/1977 | Niederprüm et al. ........ 156/663 |
| 4,217,027 A | 8/1980 | MacChesney et al. .. 385/123 X |
| 4,387,222 A | 6/1983 | Koshar ........................... 544/4 |
| 4,505,997 A | 3/1985 | Armand et al. .............. 429/192 |
| 4,636,405 A * | 1/1987 | Mensah et al. .............. 427/493 |
| 4,655,545 A | 4/1987 | Yamanishi et al. .......... 385/141 |
| 4,854,956 A | 8/1989 | Pluijms et al. ................... 65/2 |
| 5,021,308 A | 6/1991 | Armand et al. .............. 429/194 |
| 5,072,040 A | 12/1991 | Armand ........................ 564/82 |
| 5,146,531 A * | 9/1992 | Shustack ..................... 385/128 |
| 5,162,177 A | 11/1992 | Armand et al. .............. 429/194 |
| 5,273,840 A | 12/1993 | Dominey ..................... 429/192 |
| 5,340,898 A | 8/1994 | Cavezzan et al. ............. 528/19 |
| 5,352,712 A * | 10/1994 | Shustack ....................... 522/31 |
| 5,448,672 A | 9/1995 | Blonder et al. .............. 385/123 |
| 5,468,902 A | 11/1995 | Castellanos et al. ........... 568/6 |
| 5,536,529 A * | 7/1996 | Shustack .................. 427/163.2 |
| 5,550,265 A | 8/1996 | Castellanos et al. ........... 556/7 |
| 5,554,664 A | 9/1996 | Lamanna et al. ............. 522/25 |
| 5,639,846 A * | 6/1997 | Shustack ...................... 528/44 |
| 5,668,192 A | 9/1997 | Castellanos et al. .......... 552/31 |
| 5,807,905 A | 9/1998 | Cunningham et al. ........ 522/25 |
| 6,048,911 A * | 4/2000 | Shustack et al. .............. 522/96 |
| 6,057,078 A | 5/2000 | Cunningham et al. ...... 430/269 |
| 6,171,698 B1 * | 1/2001 | Khudyakov et al. ........ 428/378 |
| 6,372,895 B1 * | 4/2002 | Bentsen et al. .............. 536/4.1 |

FOREIGN PATENT DOCUMENTS

| | | | |
|---|---|---|---|
| EP | 0614958 B1 | 9/1994 | ......... C09D/186/06 |
| GB | 2307473 A | 5/1997 | ............. C07F/5/02 |
| WO | WO 95/03338 | 2/1995 | ............. C08F/4/00 |
| WO | WO 98/52952 | 11/1998 | ............. C07F/5/02 |

OTHER PUBLICATIONS

L. Turowsky & K. Seppelt, "Tris((trifluoromethyl)sulfonyl)methane, $HC(SO_2CF_3)_3$", *Inorganic Chemistry*, vol. 27, No. 12, (American Chemical Society, 1988), pp. 2135–2137.

* cited by examiner

*Primary Examiner*—Brian Healy
(74) *Attorney, Agent, or Firm*—Gary L. Griswold; Peter L. Olson

(57) ABSTRACT

A GGP fiber is provided which resists strength degradation upon exposure to high temperature/high humidity environments. The fiber comprises a polymeric coating, or P-coat, which is cured with a photoinitiator such as an iodonium methide salt which does not hydrolyze to release HF or fluoride ion.

19 Claims, 2 Drawing Sheets

OPTICAL FIBER WITH IMPROVED STRENGTH IN HIGH HUMIDITY/HIGH TEMPERATURE ENVIRONMENTS

REFERENCE TO CROSS-RELATED APPLICATIONS

This application claims priority from U.S. Provisional Application Serial No. 60/167,359, filed Nov. 22, 1999.

FIELD OF THE INVENTION

This invention relates generally to optical fibers, and more specifically to optical fibers with polymeric coatings.

BACKGROUND

Various types of optical fibers are known to the art. One type of optical fiber which is of particular interest is GGP fiber (glass, glass, polymer), so called because it includes a glass core, a glass cladding, and a permanent polymeric coating or P-coat encircling the glass cladding. Optical fiber of this type is commercially available from the Minnesota Mining and Manufacturing Company (3M) under the VOLITION trade name.

A typical GGP fiber construction consists of a glass core, a reduced glass cladding (100 micron), a P-coat (125 micron) and 2 standard buffer coats (the first to provide microbend protection, the second to provide abrasion resistance), such as those available from DSM Desotech (DSM 3471-1-152A and 3471-2-136), to give a final diameter of 250 microns. By contrast, standard (non-GGP) fiber has a 125 micron glass cladding and 2 standard buffer coats (such as the DSM materials listed above) to give a final diameter of 250 microns.

The P-coat in GGP fiber is a cationically curable system which is typically based on epoxy resins. Other cationically curable resisn are also known, including those functionalized with cycloaliphatic epoxy groups or vinyl ethers. The P-coat, which typically contains iodonium hexafluoroantimonate, a cationic photoinitiator, is immediately applied to the fiber after the fiber is drawn from the furnace and is cured. Typically, one or more protective buffer coats are subsequently applied and cured over the P-coat to give the final GGP fiber construction.

Various other materials are also known which have been used as photoinitiators in various processes, materials, and systems, some of which are described below. Of those which have found use in fiber optic applications, most are radical photoinitiators, since the use of cationic photoinitiators in this area is still quite limited.

U.S. Pat. No. 5,668,192 (Castellanos et al.) discusses various iodonium borates as well as organometallic borates as photoinitiators. There is no mention of optical fiber in this patent.

U.S. Pat. No. 5,550,265(Castellanos et al.) discusses organometallic borates as photoinitiators. No mention of optical fiber coating or fiber strength.

GB 2307473 (Cunningham et al.) discloses organoboron photoinitiators of the generic formula G+−B ($R_1,R_2, R_3, R_4$), wherein G+ can be sulfonium or iodonium and $R_1$, $R_2$, $R_3$ and $R_4$ are alkyl groups. The photoinitiators are described as being suitable for photopolymerization of compositions with acid groups.

U.S. Pat. No. 4,854,956 (Pluijms et al.) describes a method for manufacturing optical fibers having a core and a cladding of glass applying a rod-in-tube technique. The reference discusses the use of HF etching solution and its effects on glass. The reference notes that, as fracture points often occur at points of contamination on the glass, HF solution can be employed to etch the quartz glass tubes. According to the reference, the conglomerates of alien particles are not attacked or hardly attacked, but the surrounding glass is attacked. After reaching a certain etching depth (10 micron) parts of conglomerates work loose from the surface with very low forces, such as the forces created in rinsing away the etchant.

U.S. Pat. No. 5,448,672 (Blonder et al.) discloses optical fibers with matte finishes. The authors use mixtures of buffered hydrofluoric acid (e.g., HF and $NH_4F$) and a treating agent (acetic acid, phosphoric acid, sulfuric acid) to produce a matte finish on optical fibers, for purposes of reduced glare or improved adhesion. The background includes a reference to U.S. Pat. No. 4,055,458 which discloses the etching of glass by means of liquids containing HF.

U.S. Pat. No. 4,655,545 (Yamanishi et al.) discloses a glass fiber suitable for use in optical transmission. The reference discusses an optical fiber that has been extrusion coated with a fluorine containing resin, which are often found to have a mechanical strength which is much lower than fibers extrusion coated with non-fluorine containing coatings. The reference notes that "such a decrease in the mechanical strength is ascribed to fluorine gas or HF generated at the time of melt extrusion. More specifically, it is believed that fluorine gas or hydrofluoric acid generated during the extrusion coating passes through a first baked layer and reaches the surface of the glass fibers to erode the glass surfaces or destroy chemical bonding between the glass surfaces and the baked layer thereby causing the above-described reduction in mechanical strength." The reference proposes the use of an absorbable solid powder such as titanium oxide, calcium carbonate and the like to absorb the HF that is generated.

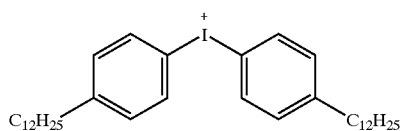

Imides

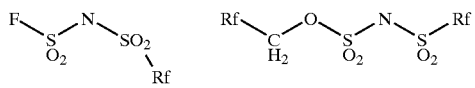

Methides

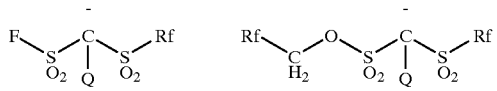

Q=H, halogen, CN, R, aryl, Rf, RfSO2, RfCH2OSO2, (Rf)2CHOSO2

EP 834492 discloses the use of ionic compounds, such as those containing poly iodonium cations, as photoinitiators, although there is no mention of the application of these materials in coating optical fibers.

EP 775706, U.S. Pat. No. 5,807,905, and WO 9852952 disclose photoinitiators that have "polyborate" anions.

U.S. Pat. No. 5,554,664 (Lammana et al.) discloses energy activated salts with fluorocarbon anions. The reference discusses the advantage of using catalysts with non-hydrolyzable anions for adhesives/coatings for electronics applications, because of the corrosiveness of HF that results from the hydrolysis of conventional initiator anions such as $PF_6$ and $SbF_6$, although the reference does not discuss the application of these materials as coatings for optical fibers. The reference focuses on methide and imide anions in onium salts, and also gives examples of initiators with borate anions.

PCT application WO 95/03338 discloses the use of salts of borates as polymerization catalysts. No reference is made to the use of the materials described therein in optical fibers.

EP 614958 discloses compositions with cationically crosslinkable polyorganosiloxane base and the use of these materials in the fields of anti-adhesion paper, fiber optics and printed circuit protection. Organometallic borate complexes are also disclosed having 4–10 groups with pi-bonded substituents (mesitlene, mesitylene, toluene etc) and borates with electron withdrawing groups, such as $NO_2$, F, Cl, or Br.

U.S. Pat. No. 5,468,902 (Castellanos et al.) and U.S. Pat. No. 5,340,898 (Cavezzan et al.) discuss iodonium borate salts and cationically crosslinkable polysiloxanes.

While GGP fibers have been produced which have many admirable physical and optical properties, some of these properties have been observed to degrade under certain extreme conditions. In particular, some GGP fibers exhibit a decrease in fiber strength, as shown in dynamic fatigue tests, when they are placed in a high temperature/high humidity environment. Such environments may be replicated in an environmental chamber (FOTP-73) which is cycled from low to high temperatures over a period of approximately 10 days.

Unfortunately, such extreme conditions may be encountered by GGP fibers in applications such as avionics, naval or submarine operations, oil field applications, or even during manufacturing or shipping. Such conditions may also be encountered outside of the plant in areas where 85° C. will likely be an upper specification temperature.

There is thus a need for a GGP fiber which exhibits greater strength retention after exposure to high temperature/high humidity environments. This and other needs are met by the present invention, as hereinafter disclosed.

SUMMARY OF THE INVENTION

Figure 1:
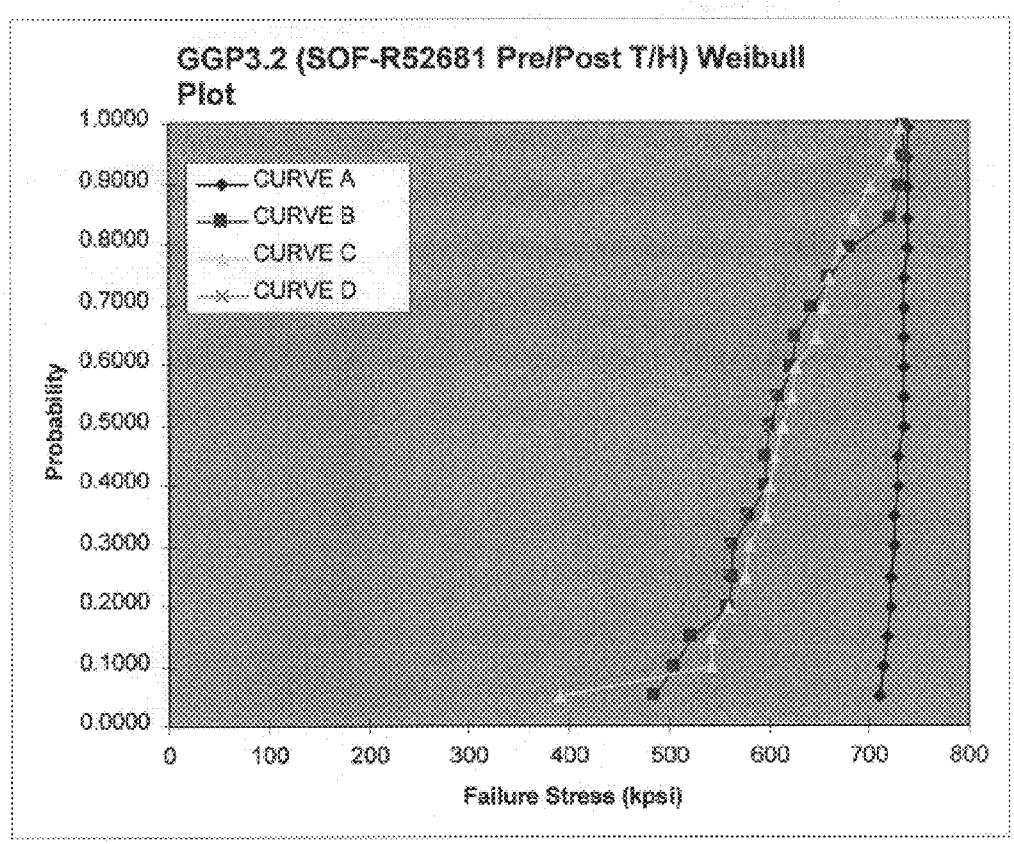
FIGS. 1–2 are plots of failure probability rank as a function of failure stress (a Weibull plot) for the optical fibers of the examples.

In one aspect, the present invention relates to a GGP fiber which exhibits greater strength retention after exposure to high temperature/high humidity cycles. Surprisingly, it has been found that the strength retention of fibers exposed to such environments can be to improved if the P-coat of the fiber is cured with a photoinitiator, such as iodonium methide, which does not hydrolyze to release HF or fluoride. By contrast, GGP fibers cured with commonly used photoinitiators such as sulfonium $PF_6$ or iodonium $SbF_6$ which are capable of undergoing such a hydrolysis reaction are seen to suffer significant strength degradation in such environments. A degradation in the strength of a fiber upon exposure to a high temperature/high humidity cycle implies that the fiber will be weaker and may possibly be found to be unacceptable if the fiber is exposed to such an environment.

Detailed Description of the Invention

In accordance with the present invention, a GGP fiber is provided which exhibits greater strength retention after exposure to high temperature/high humidity cycles. Such a GGP fiber is achieved by utilizing a P-coat formulation which has a photoinitiator that does not hydrolyze to release HF or fluoride.

The degradation in strength that is often observed in GGP fibers when such fibers are exposed to high temperature/high humidity cycles has heretofore been poorly understood. However, the present investigators have found that both environmental components—high temperature and high humidity—are required for the degradation, since little or no strength degradation is observed in fibers exposed to only one of these components. Thus, for example, fiber exposed to a high temperature/low humidity cycle in a FOTP-73 chamber does not exhibit noticeable strength degradation.

Degradation in strength implies that the GGP fiber will be weaker and may perform in an unacceptable manner when the fiber is exposed to the conditions under which strength degradation occurs. The occurrence of such degradation in high temperature/high humidity environments is especially problematic, since such conditions are frequently encountered at fiber manufacturing sites.

Without wishing to be bound by theory, it is believed that this strength degradation results from hydrolysis of the photoinitiators employed in conventional P-coat compositions. In particular, typical photoinitiators such as iodonium $SbF_6$ (see below), iodonium $PF_6$, sulfonium $SbF_6$, or sulfonium $PF_6$ initiators are capable of undergoing a hydrolysis reaction under hot, humid conditions to release HF or $F^-$. In the case of $SbF_6$, for example, the following reaction may occur when the P-coat is exposed to a hot, humid environment:

$$SbF_6+H_2O=SbF_5OH+HF$$

The HF generated by this reaction may attack the glass in the fiber or, alternatively, it may attack the epoxy silicone, thereby allowing water to attack the glass.

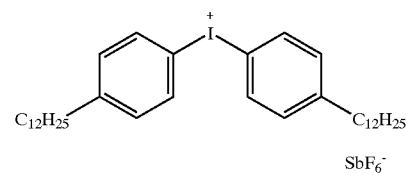

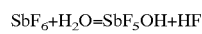

and Isopropylthioxanthone and decyl alcohol iodonium photoinitiator solution
3M 41-4205-2681-0 a.k.a R52681

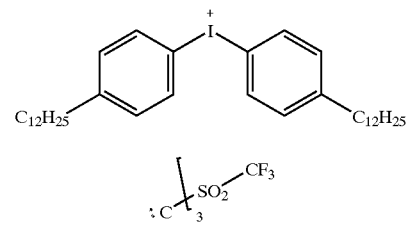

and Isopropylthioxanthone and decyl alcohol 3M iodonium Methide

In accordance with the present invention, a GGP fiber may be obtained which resists strength degradation in hot and humid conditions by utilizing a photoinitiator in the P-coat formulation which does not hydrolyze to release HF or fluoride. Examples of such photoinitiators include iodonium salts such as iodonium methide (see above), iodonium —C(SO$_2$CF$_3$)$_3$, iodonium —B (C$_6$F$_5$), and iodonium —N(SO$_2$CF$_3$)$_2$.

One class of materials particularly useful as the anionic portion of the initiators employed in the present invention may be generally classified as fluorinated (including highly fluorinated and perfluoriated) tris alkyl- or arylsulfonyl methides and corresponding bis alkyl- or arylsulfonyl imides, as represented by Formulas 2a and 2b, respectively, and hereinafter referred to as "methide" and "imide" anions, respectively, for brevity:

  (2a)

  (2b)

wherein each R$_f$ is independently selected from the group consisting of highly fluorinated or perfluorinated alkyl or fluorinated aryl radicals. The methides and imides may also be cyclic, as when a combination of any two R$_f$ groups are linked to form a bridge.

The R$_f$ alkyl chains will typically contain from 1–20 carbon atoms, with 1–12 carbon atoms preferred. The R$_f$ alkyl chains may be branched or cyclic, but are preferably straight. Heteroatoms or radicals, such as divalent oxygen, trivalent nitrogen or hexavalent sulfur, may interrupt the skeletal chain. When R$_f$ is or contains a cyclic structure, such structure preferably has 5 or 6 ring members, 1 or 2 of which can be heteroatoms. The alkyl radical R is also free of ethylenic or other carbon-carbon unsaturation, e.g., it is a saturated aliphatic, cycloaliphatic or heterocyclic radical. By "highly fluorinated" is meant that the degree of fluorination on the chain is sufficient to provide the chain with properties similar to those of a perfluorinated chain. More particularly, a highly fluorinated alkyl group will have more than half the total number of hydrogen atoms on the chain replaced with fluorine atoms. Although hydrogen atoms may remain on the chain, it is preferred that all hydrogen atoms be replaced with fluorine to form a perfluoroalkyl group, and that any hydrogen atoms beyond the at least half replaced with fluorine that are not replaced with fluorine be replaced with bromine and/or chlorine. It is more preferred that at least two out of three hydrogens on the alkyl group be replaced with fluorine, still more preferred that at least thee of four hydrogen atoms be replaced with fluorine, and most referred that all hydrogen atoms be replaced with fluorine to form a perfluorinated alkyl group.

The fluorinated aryl radicals of Formulas 2a and 2b may contain from 6 to 22 ring carbon atoms, preferably 6 ring carbon atoms, where at least one, and preferably at least two, ring carbon atoms of each aryl radical is substituted with a fluorine atom or a highly fluorinated or perfluorinated alkyl radical as defined above, e.g., CF$_3$.

Specific examples of anions useful in the practice of the present invention include: (C$_2$F$_5$SO$_2$)$_2$N—, (C$_4$F$_9$SO$_2$)$_2$N—, C$_8$F$_{17}$SO$_2$)$_3$C—, (CF$_3$SO$_2$)$_2$N—, C$_4$F$_9$SO$_2$)$_3$C—, (CF$_3$SO$_2$)$_2$(C$_4$F$_9$SO$_2$)C—, (CF$_3$SO$_2$)(C$_4$F$_9$SO$_2$)N—, [(CF$_3$)$_2$NC$_2$F$_4$SO$_2$N—, (CF$_3$)$_2$NC$_2$F$_4$SO$_2$C—(SO$_2$CF$_3$)$_2$, (3,5-bis (CF$_3$)C$_6$H$_3$)SO$_2$N— SO$_2$CF$_3$, and the like. More preferred an those described by Formula 2a, wherein R is a perfluoroalkyl radical having 1–4 carbon atoms. Anions of this type, and methods for making them, are described in U.S. Pat. No. 4,505,997, U.S. Pat. No. 5,021,308, U.S. Pat. No. 4,387,222, U.S. Pat. No. 5,072,040, U.S. Pat. No. 5,162,177, and U.S. Pat. No. 5,273,840, and in Turowsky and Seppelt, Inorg. Chem., 27, 2135–2137 (1988). Turowsky and Seppelt describe the direct synthesis of the (CF$_3$SO$_2$),C— anion from CF$_3$SO$_2$F and CH$_3$MgCl in 20% yield based on CF$_3$SO$_2$F (19% based on CH$_3$MgCl). U.S. Pat. No. 5,554, 664 describes an improved method for synthesizing iodonium methide.

Salts of the above described anions may be activated by radiation or by heat or may require two stage activation involving radiation followed by heat. Suitable salts having such non-nucleophilic anions for use as photoinitiators in the polymeizable P-coat compositions of the instant invention are those salts that upon application of a sufficient energy-thermal, an accelerated particle beam (electron beam), or electromagnetic radiation having a wavelength from about 200 to 800 nm, will generate reactive species capable of initiating or catalyzing the polymerization of the P-coat compositions.

A typical GGP fiber construction made in accordance with the invention consists of a glass core, a reduced glass cladding (100 micron), a P-coat (125 micron) and 2 standard buffer coats (the first to provide microbend protection, the second to provide abrasion resistance), such as those available from DSM Desotech (DSM 3471-1-152A and 3471-2-136), to give a final diameter of 250 microns. However, the present invention is not limited to a particular fiber construction. Thus, other constructions are also contemplated for use in the present invention which have varying individual layer thicknesses or total fiber diameters. The diameter of the glass core may also be varied, depending on whether the fiber is intended for single mode use (in which case the core diameter is typically about 8 microns) or multimode (in which case the core diameter will typically be about 50–62 microns). Typically, thinner fibers are found to experience greater strength degradation in a hot, humid environment, since there is a smaller glass diameter to start with.

OPTICAL FIBERS AND PRE-FORMS

The following is a description of the optical fibers and pre-forms referred to in the examples.

GGP3.1—a P-coat formulation consisting of 95% resins and 5% of a photoinitiator. The resins are a 42:58 ratio of Epon 828 (a bisphenol diglycidyl ether resin available commercially from Shell Chemical Co., Houston, Tex., and GP554 (a silicone with a high level of epoxy functionality, available commercially from Genesee Polymers Inc., Flint Mich.

GGP3.2—a P-coat formulation having the same composition as GGP3.1, except that the ratio of Epon 828: GP554 is 60:40.

TESTS AND PROCEDURES

The following is a description of the tests and procedures that are referred to throughout the present application.

PREPARATION OF FIBER OPTIC PRE-FORM

The fiber optic pre-forms used in the following examples were prepared in accordance with the methods described in U.S. Pat. No. 4,217,027 (MacChesney et al.), which is incorporated herein by reference.

FIBER DRAWING PROCESS

The fiber optic draw tower used in the draw process was based on an enclosed Nokia system which featured a Nokia-Maillefer fiber draw tower (Vantaa, Finland). To begin the draw process, a downfeed system was used to control the rate at which the optical pre-form was fed into a 15KW Lapel Zirconia induction furnace (Lapel Corp., Maspeth, N.Y.) in which the pre-form was heated to a temperature at which it may be drawn to a fiber (between 2200 to 2250° C.). Below the heat source, a LaserMike™ laser telemetric measurement system was used to measure the drawn fiber diameter as well as monitor the fiber position within the tower.

The newly formed fiber was then passed to a primary coating station at which the protective coating was applied. The coating station included a coating die assembly, a Fusion Systems R Corp. microwave UV curing system, a concentricity monitor, and another laser telemetric system. The coating die assembly, based on a Norrsken Corp. design, consisted of a sizing die(s), back pressure die and a containment housing which was mounted on a stage having adjustment for pitch and tilt and x-y translation. These adjustments were used to control coating concentricity. The protective coating material was supplied to the coating die assembly from a pressurized and was applied, cured and measured within the primary coating station.

The coated fiber then proceeded to a secondary coating station where a buffer was applied to the coated fiber. In certain cases it was desirable to apply two buffer layers simultaneously in a wet-on-wet application at the secondary coating station. In this case an additional sizing die as used and an additional vessel was used to supply material to this die. The coatings were applied, one after the other, and then cured and outer diameter measured. As required, additional coatings could be applied via additional coating stations. Ultimately, the completed optical fiber element was drawn through a control capstan and onto a take-up spool (Nokia).

DYNAMIC FATIGUE TESTING PROCEDURE

With the following noted exceptions, this test was performed in accordance with Fiber Optic Test Procedure ("FOTP") 28, entitled "Method for Measuring Dynamic Tensile Strength of Optical Fiber", and numbered EIA/TIA-455–28B (Revision of EIA-455–28A), where EIA stands for Electronic Industries Association and TIA stands for Telecommunications Industry Association. The exceptions are as follows:

Strain rate=9% per minute

Gage length=4 meters

Environment=Ambient laboratory.

FIBER OPTIC TESTING PROCEDURE (FOTP 73)

FOTP 73 is a test in which samples of fiber are placed in a programmable chamber capable of wide ranges in temperature and humidity (the T_H or T/H test of the title). Typically, instrumentation monitors the wavelengths travelling through the fiber in response to the changing environment. The samples are exposed to a maximum temperature of 85° C. with a relative humidity of 98% and a minimum temperature of −10° C. with a relative humidity of 25%. Each stopping point is approximately 3 hours and the test is run for 10 days. The fiber samples see the extreme conditions of 85° C. and 98%RH for 42 hours.

In the following examples, the fiber's dynamic tensile strength was then measured per FOTP 28, although this measurement is not part of the FOTP 73. It is to be noted that, in conducting the temperature/humidity test, the fiber is wound on a quartz spool or collapsible aluminum spool, both of which differ from a standard thermoplastic storage spool, the later being unsuitable for the high temperatures experienced during the test. Quartz glass expands at the same rate as the fiber, so no extra stress is applied to the fiber during the environmental test simply due to spool expansion. The collapsible aluminum spools were developed as convenient, inexpensive, durable, small alternatives to the quartz spools. The fiber is wound on the spools which are then collapsed so that the fiber hangs loosely.

COMPARATIVE EXAMPLE 1

An optical fiber pre-form was prepared in accordance with the PREPARATION OF FIBER OPTIC PRE-FORM PROCESS. Pat. No. The pre-form was subsequently drawn in accordance with the FIBER DRAWING PROCESS, during which a P-coat was applied that was cured with iodonium hexafluoroantimonate photoinitiator.

COMPARATIVE EXAMPLE 2

The fiber of COMPARATIVE EXAMPLE 1 was divided into 20 pieces of approximately equal length, and each of the 20 pieces was then subjected to the DYNAMIC FATIGUE TESTING PROCEDURE. The results are depicted graphically in FIG. 1 as CURVE A.

COMPARATIVE EXAMPLES 3–5

Three additional optical fibers were prepared in accordance with COMPARATIVE EXAMPLE 1. The resulting fibers, which are referred to hereinafter as COMPARATIVE EXAMPLES 3–5, were identical except for minor variations caused by normal fluctuations in manufacturing process parameters. Each fiber was then exposed to the conditions of the FIBER OPTIC TESTING PROCEDURE and was then analyzed by way of the DYNAMIC FATIGUE TESTING PROCEDURE in order to ascertain the effect of a high temperature/high humidity environment on fiber strength. The results of the DYNAMIC FATIGUE TESTING PROCEDURE for COMPARATIVE EXAMPLES 3–5 are depicted as a Weibull distribution in FIG. 1 as CURVES B, C, and D, respectively.

As shown in FIG. 1, the fibers of COMPARATIVE EXAMPLES 3–5 clearly exhibit a strength degradation after thermal humidity cycling as compared to the fiber of COMPARATIVE EXAMPLE 1 which, though of the same composition, was not subjected to the thermal humidity cycle.

EXAMPLE 1

Figure 2:
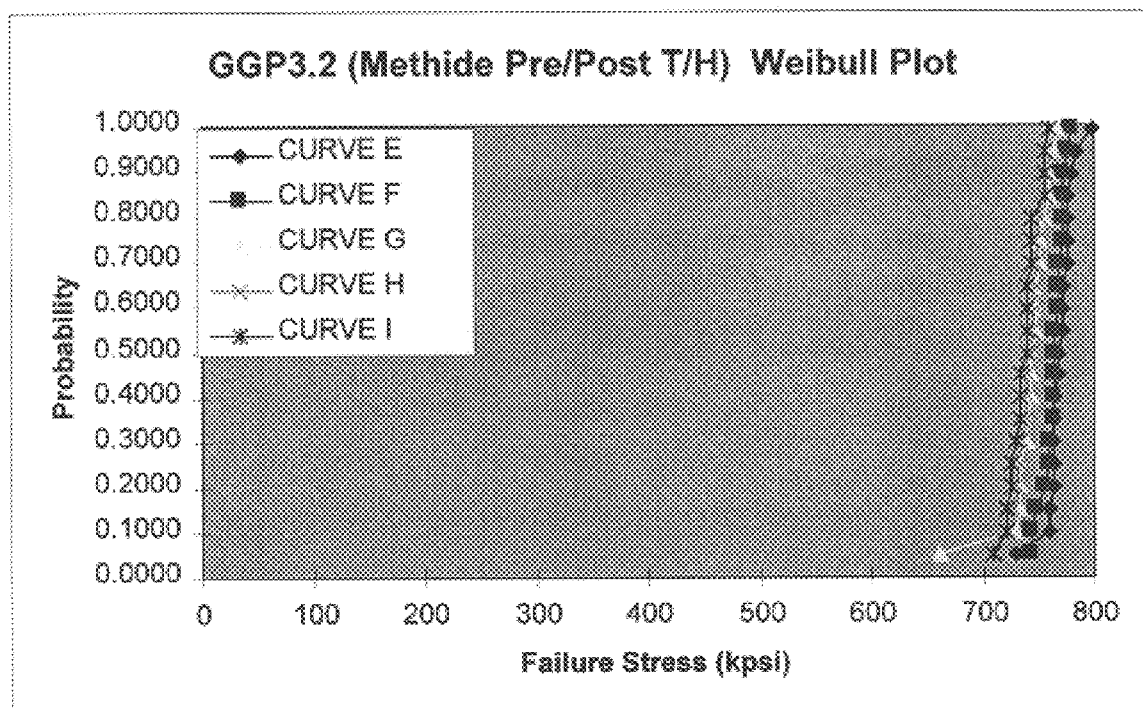

A fiber was prepared in accordance with the methodology of COMPARATIVE EXAMPLE 1, except that the P-coat formulation was GGP3.2 which was cured with an iodonium methide photoinitiator. The fiber was divided into 20 pieces of approximately equal length, and each of the 20 pieces was then subjected to the DYNAMIC FATIGUE TESTING PROCEDURE. The results are depicted graphically in FIG. 2 as CURVE E.

EXAMPLES 2–5

Three fibers were prepared in accordance with the methodology of EXAMPLE 1. The resulting fibers, which are referred to hereinafter as EXAMPLES 2–5, were identical except for minor variations caused by normal fluctuations in manufacturing process parameters.

Each fiber was then divided into 20 pieces of approximately equal length, was exposed to the conditions of the FIBER OPTIC TESTING PROCEDURE, and was then analyzed by way of the DYNAMIC FATIGUE TESTING PROCEDURE in order to ascertain the effect of a high temperature/high humidity environment on fiber strength. The results of the DYNAMIC FATIGUE TESTING PROCEDURE for EXAMPLES 2–5 are depicted as a Weibull distribution in FIG. 2 as CURVES F, G, H, and 1, respectively.

In contrast, the graph below compares the dynamic fatigue of GGP3.2 fiber cured with the iodonium methide photoinitiator. There is no degradation in strength upon exposure of the fiber to the high temperature/high humidity environmental chamber.

COMPARATIVE EXAMPLES 6–8

The following examples illustrates the tendency of various P-coat formulations containing photoinitiators to hydrolyze so as to generate fluoride ion in a humid environment.

Two samples of P-coat formulations cured with different photoinitiators were provided in film form. In COMPARATIVE EXAMPLE 6, the film was GGP3.2 cured with 5% UVI 6974 sulfonium $SbF_6$, a photoinitiator which is commercially available from Union carbide. In COMPARATIVE EXAMPLE 7, the film was GGP3.2 cured with 5% UVI 6990 sulfonium PF6 photoinitiator (also available commercially from Union Carbide). In COMPARATIVE EXAMPLE 8, the film was GGP3.2 cured with iodonium $SbF_6$ photoinitiator.

A hot-water extraction method was used to transport the fluoride from the sample into aqueous solution, and a DX-500 Ion Chromatography system was used to analyze the fluoride content in that solution. The samples were weighed into PTFE cups and 10 ml of ultra-pure water added by pipette. The cups were then covered with a PTFE cap, placed into a stainless steel bomb cylinder and heated at 105° C. for a period of 20 hours. This procedure was completed in triplicate for each sample. Fluoride analyses of the samples were carried out using a Dionex DX 500 Ion Chromatography system (consisting of a GP40 quaternary gradient pump, AS3500 Autosampler, SRS Self-Regenerating Chemical suppressor, and an ED40 Electrochemical Detector with a conductivity cell). A Dionex IonPac AS14 anion exchange column (IonPac AG14 guard column) and 4.8 mm sodium carbonate/0.6 mm sodium bicarbonate eluent was employed to perform the separation. The mobile phase was delivered at a flow rate of 1.2 ml/min. The analysis used a 50 μL injection for sample and standard solutions. The standards ranged from 0.01–10 ppm.

The results are reported in TABLE 1 as parts per million fluoride, and are an average of the replicates with the error range being the standard deviation.

TABLE 1

| EXAMPLE | Fluoride Concentration (ppm) |
| --- | --- |
| COMPARATIVE EXAMPLE 6 | 735.3 (+/−83) |
| EXAMPLE 6 | 12.6 (+/−2) |
| COMPARATIVE EXAMPLE 7 | 246.9 (+/−46) |
| EXAMPLE 7 | <0.8 |
| COMPARATIVE EXAMPLE 8 | 395.5 (+/−90) |
| EXAMPLE 8 | <3.1 |

EXAMPLES 6–8

The experiment of COMPARATIVE EXAMPLES 6–8 was repeated using similar p-coat compositions made from photoinitiators which are not capable of hydrolyzing to generate fluoride ion. The film of EXAMPLE 6 was GGP3.2 cured with 5% PC702 iodonium "borate" photoinitiator, a photoinitiator which is commercially available from Rhodia or Rhone-Poulenc. The film of EXAMPLE 7 was GGP3.2 cured with 5% iodonium "imide" photoinitiator. The film of EXAMPLE 8 was GGP3.2 cured with iodonium methide photoinitiator.

As indicated by the results in TABLE 1, the films generated from p-coat formulations containing photoinitiators that are capable of hydrolyzing to generate fluoride ion were observed to undergo such a hydrolysis. By contrast, far lower fluoride ion concentrations were observed with the P-coat formulations that did not contain such photoinitiators. These results strongly correlate with the strength of the respective fibers after exposure to hot/humid environments. Initiators that generate extractable fluoride lead to fibers that degrade in strength, while initiators that do not yield significant extractable fluoride maintain high strength.

The preceding description of the present invention is merely illustrative, and is not intended to be limiting. Therefore, the scope of the present invention should be construed solely by reference to the appended claims.

What is claimed is:

1. An optical fiber, comprising:

a glass core;

a glass cladding; and a polymeric coating, comprising a photoinitiator that does not hydrolyze to release HF or fluoride ion.

2. The optical fiber of claim 1, wherein said glass cladding is disposed on said glass core.

3. The optical fiber of claim 1 or 2, wherein said polymeric coating is disposed on said glass cladding.

4. The optical fiber of claim 1, wherein said photoinitiator comprises an organic cation and an anion, and wherein said anion is devoid of fluorine.

5. The optical fiber of claim 1, wherein said photoinitiator comprises an organic cation and an anion, and wherein any fluorine atoms in said anion are covalently bonded to carbon.

6. The optical fiber of claim 1, wherein said photoinitiator is a salt having an anion selected from the group consisting of methides, imides, and borates.

7. The optical fiber of claim 6, wherein said photoinitiator is a salt having a methide anion.

8. The optical fiber of claim 1, wherein said photoinitiator is a salt having an anion selected from the group consisting of —$C(SO_2CF_3)_3$, —$B(C_6F_5)$, and —$N(SO_2CF_3)_2$.

9. The optical fiber of claim 1, wherein said photoinitiator is a salt having an onium cation.

10. The optical fiber of claim 9, wherein said cation is selected from the group consisting of iodonium cations and sulfonium cations.

11. The optical fiber of claim 1, wherein said photoinitiator is selected from the group consisting of:

iodonium methide, iodonium —$C(SO_2CF_3)_3$, iodonium —$B(C_6F_5)$, and iodonium —$N(SO_2CF_3)_2$—.

12. The optical fiber of claim 1, wherein said photoinitiator is iodonium methide.

13. The optical fiber of claim 1, wherein said photoinitiator is iodonium salt having the anion —$B(C_6F_5)$.

14. The optical fiber of claim 1, wherein said photoinitiator is iodonium —$N(SO_2CF_3)_2$—.

15. The optical fiber of claim 1, wherein said photoinitiator is an iodonium salt having the anion —$C(SO_2CF_3)_3$.

16. The optical fiber of claim 15, wherein said photoinitiator is bis dodecyl phenyl iodonium tris trifluoromethyl sulfonyl methide).

17. An optical fiber element, comprising:
   an optical fiber having a numerical aperture ranging from 0.08 to 0.34; and
   a protective coating affixed to the outer surface of said optical fiber, said protective coating having a Shore D hardness value of at least 65;
   wherein said protective coating comprises a photoinitiator that does not hydrolyze to release HF or fluoride.

18. The optical fiber element of claim 17, wherein said photoinitiator is an iodonium methide salt.

19. An optical fiber, comprising:
   a glass core;
   a glass cladding, disposed about said core; and
   a polymeric coating disposed on said cladding, said coating comprising a photoinitiator having a non-hydrolyzable anion.

* * * * *

UNITED STATES PATENT AND TRADEMARK OFFICE
CERTIFICATE OF CORRECTION

PATENT NO. : 6,587,628 B1
DATED : July 1, 2003
INVENTOR(S) : Walker, Christopher B. Jr.

It is certified that error appears in the above-identified patent and that said Letters Patent is hereby corrected as shown below:

Column 5,
Line 4, delete "-$B(C_6F_5)$," and insert -- $B(C_6F_5)_4$, -- therefor.
Line 57, delete "$C_8F_{17}SO_2)_3C$–" and insert -- $(C_8F_{17}SO_2)_3C$-, $(CF_3SO_2)_3C$- -- therefor.
Line 57, delete "$C_4F_9SO_2)_3C$-" and insert -- $(C_4F_9SO_2)_3C$-, -- therefor.
Lines 58-59, delete "[$(CF_3)_2NC_2F_4SO_2N$-" and insert -- $(CF_3)_2NC_2F_4SO_2N$- -- therefor.
Line 61, delete "an" and insert -- anions are -- therefor.

Column 6,
Line 1, delete "$(CF_3SO_2),C$-" and insert -- $(CF_3SO_2)_3C$- -- therefor.

Column 8,
Line 13, after "PROCESS." delete "Pat. No.".

Column 9,
Line 6, delete "1" and insert -- | -- therefor.

Column 10,
Lines 50, 59 and 63, delete "-$B(C_6F_5)$," and insert -- -$B(C_6F_5)_4$, -- therefor.

Column 11,
Line 3, after "methide" delete ")".

Signed and Sealed this

Twenty-seventh Day of July, 2004

JON W. DUDAS
*Acting Director of the United States Patent and Trademark Office*